United States Patent [19]

Ueda

[11] Patent Number: 4,585,360
[45] Date of Patent: Apr. 29, 1986

[54] ELECTRONIC EQUIPMENT HAVING A CHARACTER SEQUENCE MEMORY AND A CHARACTER DISPLAY

[75] Inventor: Hiroyuki Ueda, Kawasaki, Japan

[73] Assignee: Canon Kabushiki Kaisha, Tokyo, Japan

[21] Appl. No.: 641,352

[22] Filed: Aug. 15, 1984

Related U.S. Application Data

[63] Continuation of Ser. No. 401,896, Jul. 26, 1982, abandoned.

[30] Foreign Application Priority Data

| Sep. 1, 1981 | [JP] | Japan | 56-136114 |
| Sep. 1, 1981 | [JP] | Japan | 56-136115 |
| Sep. 11, 1981 | [JP] | Japan | 56-142341 |
| Sep. 11, 1981 | [JP] | Japan | 56-142342 |
| Sep. 11, 1981 | [JP] | Japan | 56-142343 |

[51] Int. Cl.$^4$ .............................................. B41J 5/30
[52] U.S. Cl. ..................................... 400/63; 400/70; 400/83; 360/13; 364/900
[58] Field of Search .................. 400/3, 63, 69, 70, 76, 400/83, 84, 85, 279, 315, 316; 360/4, 13, 50; 364/900; 369/83

[56] References Cited

U.S. PATENT DOCUMENTS

| 1,509,228 | 9/1924 | Carino | 400/315 X |
| 2,379,862 | 7/1945 | Bush | 400/3 |
| 3,248,705 | 4/1966 | Dammann et al. | 400/83 X |
| 3,260,340 | 7/1966 | Locklar et al. | 400/63 X |
| 3,618,032 | 11/1971 | Goldberry et al. | 400/63 X |
| 3,671,683 | 6/1972 | Rahenkamp et al. | 400/63 X |
| 3,913,721 | 10/1975 | Koplow et al. | 400/63 |
| 4,028,681 | 6/1977 | Vittorelli | 400/63 X |
| 4,212,077 | 7/1980 | Vittorelli | 400/83 X |
| 4,240,075 | 12/1980 | Bringol | 400/279 X |
| 4,250,560 | 2/1981 | Dethloff et al. | 400/63 X |
| 4,264,217 | 4/1981 | De Sieno | 400/63 |
| 4,266,280 | 5/1981 | Heinzl et al. | 360/13 X |
| 4,355,913 | 10/1982 | Rutkowski, Jr. | 400/279 X |

OTHER PUBLICATIONS

IBM Technical Disclosure Bulletin, "Line Count and Search", McDonald et al., vol. 9, No. 12, May 1967, pp. 1715–1716.

*Primary Examiner*—Ernest T. Wright, Jr.
*Attorney, Agent, or Firm*—Fitzpatrick, Cella, Harper & Scinto

[57] ABSTRACT

Electronic equipment such as an electronic typewriter has memory means for storing character information. When the character information in the memory means is to be corrected, the character information is rearranged within the memory means and then a portion of the character information which requires correction is corrected. Directory fields for the character information are of variable length. When more than a predetermined number of specific characters are present in the character information, a next sequence of characters of the character information is automatically tranferred to a display without requiring keying operation. A specific code is added to each paragraph of the character information to facilitate reference paragraph by paragraph.

18 Claims, 16 Drawing Figures

ELECTRONIC EQUIPMENT HAVING A CHARACTER SEQUENCE MEMORY AND A CHARACTER DISPLAY

This application is a continuation of application Ser. No. 401,896, filed July 26, 1982, now abandoned.

BACKGROUND OF THE INVENTION

1. Field of the Invention

The present invention relates to electronic equipment such as an electronic typewriter having a character sequence memory and a character display.

2. Description of the Prior Art

In a modern electronic typewriter, the keyboard and the print unit of a mechanical typewriter have been implemented electronically so that various disadvantages encountered in the mechanical typewriter are eliminated, a relatively good key depression touch is obtainable and various functions are attained.

Such an electronic typewriter uses a memory for executing various functions. A high integration density of memory cells is attainable in such a memory and a low cost and relatively large capacity non-volatile memory is available without relying on an external storage such as a magnetic storage. Such a memory is used to store a sequence of characters. In the typewriter having a character sequence memory, an index comprising one or more characters is allotted to each of frequently used idiomatic phrases, words and addresses in order to register a plurality of such idioms in the memory of the typewriter. On the other hand, the character sequence registered in the memory can be read out and printed out.

In the prior art electronic typewriter, however, in order to allow correction such as insertion or deletion of a character sequence, it is necessary to limit a length of the character sequence to be corrected or to provide a large capacity memory for the correction. In addition, it is difficult for an operator to use the entire character sequence memory.

For example, FIG. 1 shows a schematic block diagram of a partial configuration of a prior art electronic equipment having a character sequence memory. A character sequence memory 1 and a character sequence correction buffer 2 are connected to a signal line CS for defining read/write timing and an address data bus ADB, respectively. Data are written into or read from a memory location specified by an address appearing on the address data bus ADB in accordance with the read/write timing signal appearing on the signal line CS. As shown in FIG. 2, the character sequence memory 1 contains four directories (indexes), DIR(A), DIR(B), DIR(C) and DIR(D) and corresponding character sequences (A), (B), (C) and (D). Each of the directories, for example, the directory DIR(B), comprises an 8-byte index (ID), a 2-byte start address (address information field ADR) for the corresponding character sequence and a 2-byte effective character count information field (CNT) as shown in FIG. 3. The character sequences (A), (B), (C) and (D) are coded characters (e.g. by an ASCII code) and the lengths of the character sequences are variable. In such a configuration, when it is desired to correct the character sequence (B) (for example, to insert or delete a character or characters), the content of the character sequence (B) is written into the character sequence correction buffer 2 through the address data bus ADB and the desired character or characters are inserted or deleted. After the sequence of a correction operation is completed, the corrected character sequence is transferred immediately behind the character sequence (D) in the character sequence memory 1 and stored therein. As a result, the character sequence (B) in FIG. 2 becomes an invalid character sequence and the directory DIR(B) has the address information and the character count information updated, as shown in FIG. 4.

When such a prior art character sequence memory control method is applied to the electronic typewriter, only a limited area is utilized and the character sequence memory 1 cannot be utilized efficiently. In addition, as described above, since the invalid character sequence appears, an operation to delete the invalid character sequence is required and a large capacity character sequence correction buffer 2 is required. The number of characters to be inserted for a given character sequence is undefined and the capacity of the character sequence correction buffer 2 must be as large as possible so long as the capacity of the character sequence memory 1 permits the insertion.

In the character sequence memory 1 used in the prior art electronic typewriter, the number of indexes which can be registered is limited and it is difficult to register a number of short character sequences, or when a plurality of short character sequences are registered memory areas which are not used nevertheless appear in the character sequence memory 1 and hence a very low efficiency character sequence memory 1 results.

For example, when it is desired to add short character sequences (E), (F) and (G) in the configuration of FIG. 1, the memory 1 has two vacant fields 1A and 1B as shown in FIG. 2 and hence the directories DIR(E) and DIR(F) and the corresponding character sequences (E) and (F) can be added, but a directory DIR(G) for the character sequence (G) cannot be formed in spite of the fact that the character sequence memory 1 includes unused memory areas as shown in FIG. 8. Thus, a character sequence (G) cannot be stored in the character sequence memory 1. This is caused by the fact that the character sequence memory 1 is split into the directory fields DIR(A)-DIR(F) and the character fields (A)-(F) in order to simplify the character sequence insertion operation. Thus, the prior art character sequence memory 1 has been used in a very inefficient manner.

The electronic typewriter having a character sequence memory 1 as described above can register specific sentences or frequently used idiomatic phrases, words or addresses in the memory 1, and a selected one of the registered character sequences can be accessed by a keying operation, corrected as required and printed out. In such an electronic typewriter, a character display is used to permit reference to characters input thereto.

However, in most of the prior art character displays, on the order of 20 characters may be shown. Thus, when a registered character sequence having heading blank characters which extend beyond the number of characters permitted to be shown by the character display is to be referred to by the keying operation, a blank is displayed by the first keying operation. This presents a feeling of unrest to the operator. Since the reference of the character sequence is carried out by using the character display and the keyboard, the electronic typewriter displays the heading characters of the accessed character sequence, but if all of the 20 characters accessed by the first keying operation are blank characters, the operator may regard it as a failure of the character operation. If the next 20 characters which are displayed by the second keying operation are also blank characters, the same occurrence results. In addition, the keying operation for accessing the all-blank character sequence is wasteful.

In the 20-character character display, it is not possible to display the entire character sequence in one operation. Thus, when it is desired to refer to the registered character sequence paragraph by paragraph, a space key or a cursor shift key must be depressed to shift the display area so that a 20-character portion of the character sequence to be referred to is displayed on the character display. Thus, it is necessary to shift the display area to the vicinity of the end of the paragraph desired by the operator. This wastes much unnecessary time.

SUMMARY OF THE INVENTION

It is a first object of the present invention to provide electronic equipment which allow the correction of a character sequence in a simple manner.

It is a second object of the present invention to provide electronic equipment which can control a character sequence memory in a simple and efficient manner.

It is a third object of the present invention to provide electronic equipment which, when a start position of a stored character sequence is referred to, automatically start the display of a character sequence which appears after a predetermined number of continuous blank positions in order to eliminate the necessity of additional accessing keying operation.

It is a fourth object of the present invention to provide electronic equipment which can rapidly refer to a start position of a paragraph in a stored character sequence.

BRIEF DESCRIPTION OF THE DRAWING

FIGS. 1 to 4 illustrate the prior art method, in which FIG. 1 is a block diagram of a system configuration, FIG. 2 shows a configuration of a character sequence memory, FIG. 3 shows a bit configuration of a directory, and FIG. 4 shows a configuration of the character sequence memory when a character sequence has been corrected, FIGS. 5 to 7 illustrate apparatus in accordance with the present invention, in which FIG. 5 is a block diagram of an overall system configuration, FIG. 6 shows a configuration of a character sequence memory after correction, and FIG. 7 is a flow chart of a correction control procedure of the character sequence control memory.

DETAILED DESCRIPTION OF THE PREFERRED EMBODIMENTS

Figure 1:
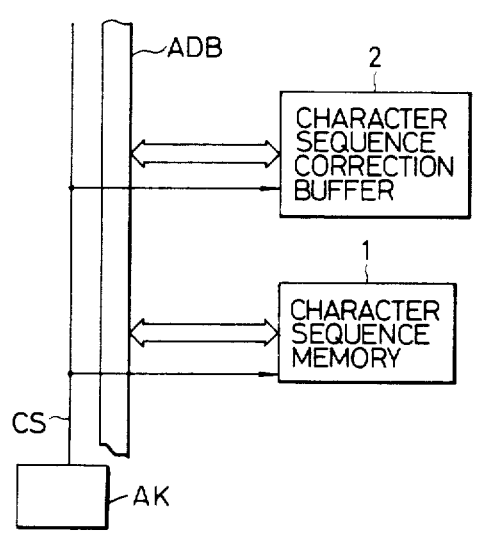
Figure 5:
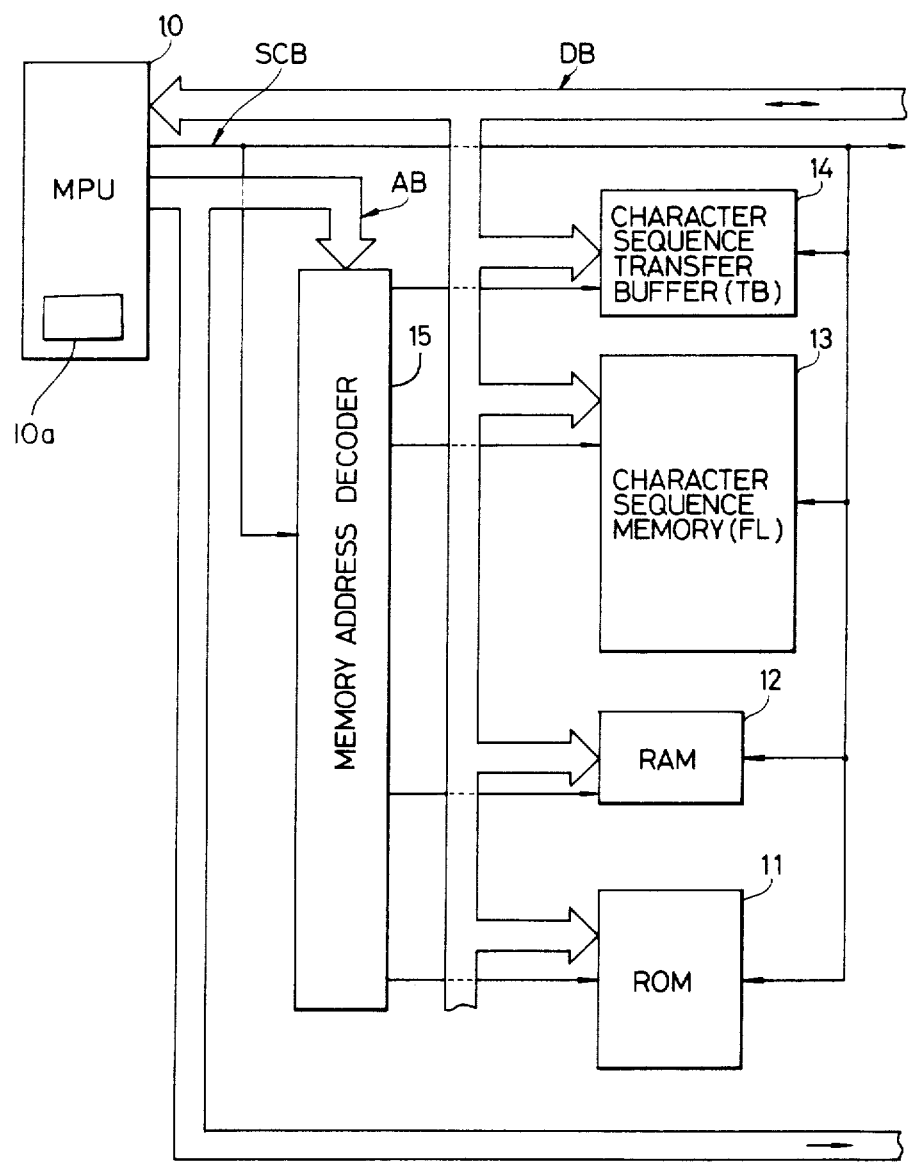

FIG. 5 shows a block diagram of a system for controlling a character sequence memory in accordance with the present invention. Numeral 10 denotes a microprocessor (MPU) which controls an overall system. Numeral 11 denotes a read-only memory (ROM) which stores therein a control sequence (for example, a program shown in FIG. 7 and explained later) for controlling the system, in a form of a control code. The MPU 10 is connected to the ROM 11 through a data bus DB and controls the system by referring to the content of the ROM 11. Numeral 12 denotes a random access memory RAM which is used as a hardware stack (a memory for buffering system conditions and temporarily used information) for the MPU 10. Numeral 13 denotes a character sequence memory similar to the character sequence memory 1 shown in FIG. 1 and it is controlled in accordance with the present invention, as will be described later. Numeral 14 denotes a character sequence transfer buffer which has a 512-character capacity in the present embodiment and has a relatively fast processing time. It may be any transfer buffer having at least one-character capacity. If the processing time can be negligible, an internal register 10a in the MPU 10 may be used as the transfer buffer 14. Numeral 15 denotes a memory address decoder which is connected to the MPU 10 through an address bus AB and which decodes an address supplied from the address bus AB to select one of the ROM 11, the RAM 12, the character sequence memory 13 and the character sequence transfer buffer 14 and connect it to the MPU 10 through the data bus DB and transmit a read/write signal and address information for controlling the system and exchange data between devices under the control by a system control bus SCB.

Figure 2:
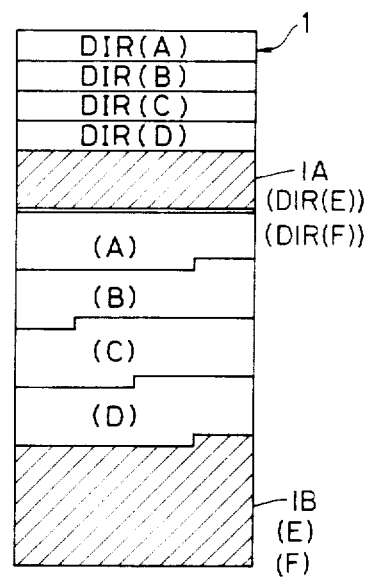
Figure 6:
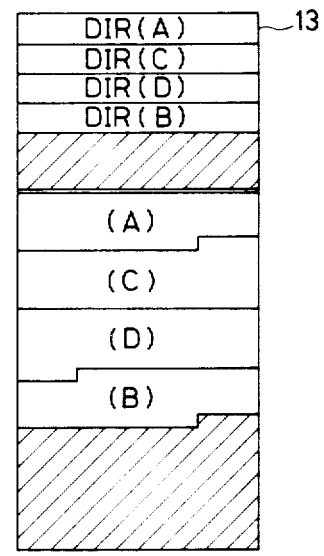

In the above system configuration, if it is desired to correct the character sequence (B) when the content of the character sequence memory 13 is that shown in FIG. 2, the character information of the character sequence (B) shown in FIG. 6, which is equal in the number of characters to the capacity of the character sequence transfer buffer 14, is transferred to the character sequence transfer buffer 14 through the data bus DB, the character sequences in the character sequence memory 13 which immediately follow the transferred-out character sequence are all transferred up one position, and the content of the character sequence transfer buffer 14 is transferred to the area immediately after the character sequence (D). The above operation is repeated until all of the character sequence (B) between the character sequence (A) and the character sequence (C) has been transferred out. Finally, the address fields (ADR) in the directories DIR(B), DIR(C) and DIR(D) are changed to the head addresses. Thus, under this condition, a logical discrepancy in the character sequence memory 13 is eliminated. If a character code is thereafter inserted, the character count field (CNT) in the directory DIR(B) (see FIG. 3) is incremented by one, and if a character code is deleted it is decremented by one and the insertion or the deletion of the character is carried out for the character sequence (B). Since the effective character information of the character sequence (B) is defined by referring the address field and the character count field of the directory DIR(B), unnecessary invalid information need not be transferred.

Accordingly, the process is carried out at a relatively high speed.

Figure 3:
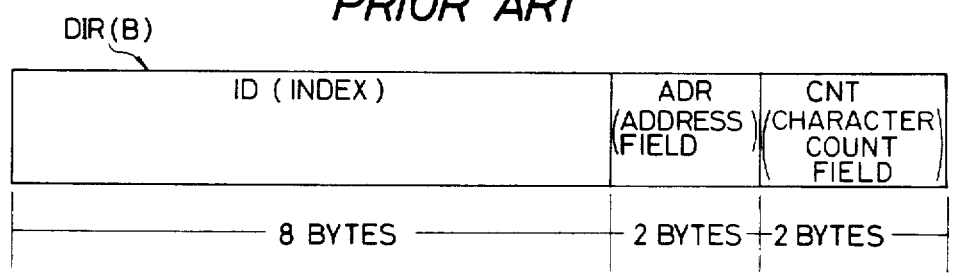
Figure 4:
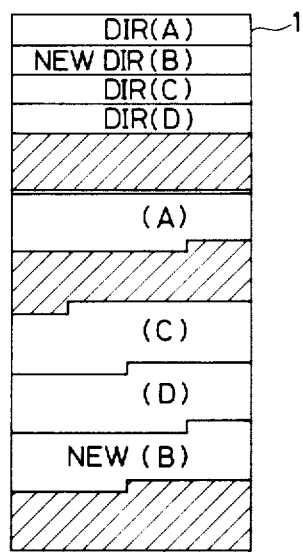
Figure 7:
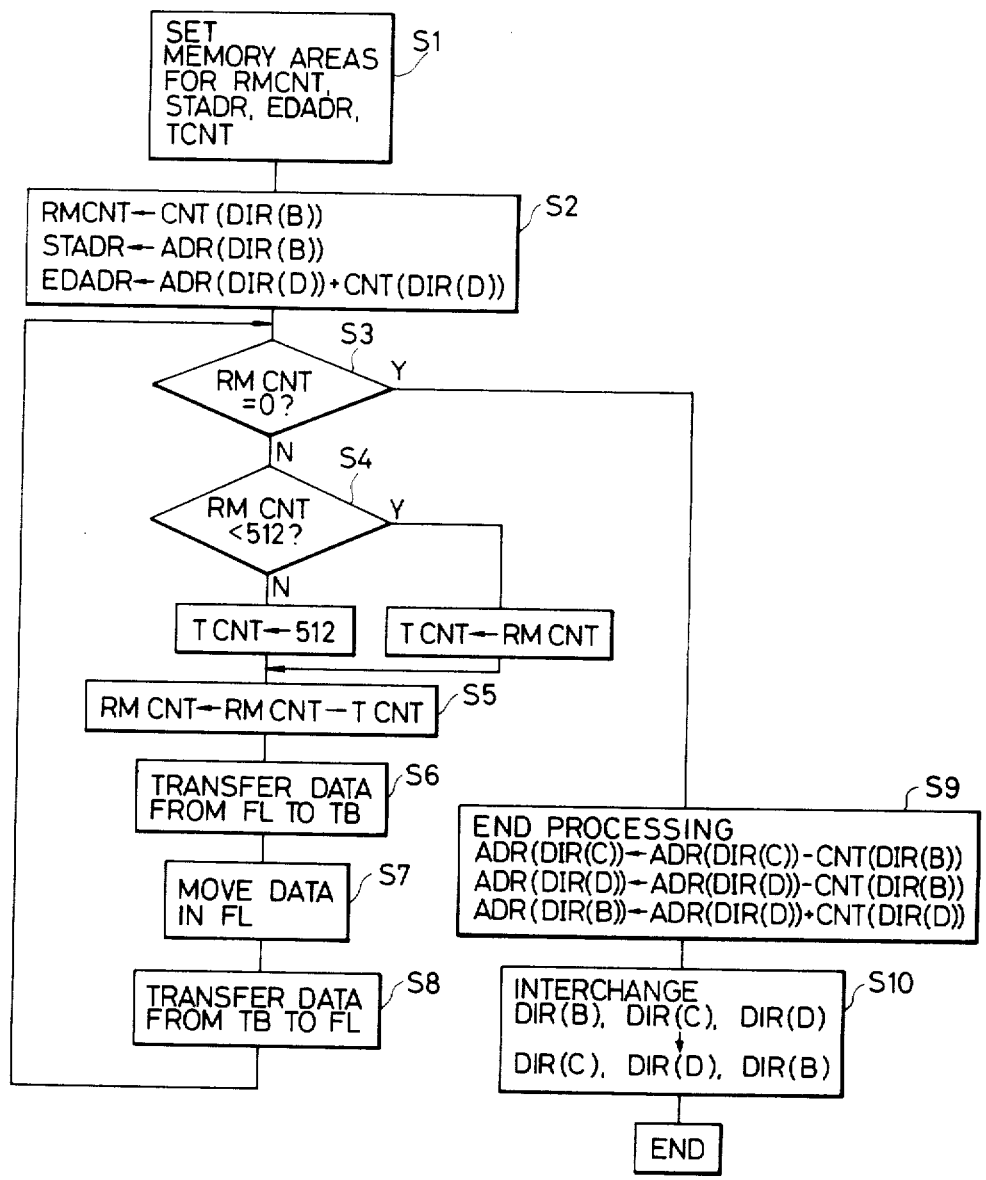

FIG. 7 shows control steps for the states in the character sequence memory 13 shown in FIG. 2 to FIG. 6. In step S1, four memory areas, RMCNT indicating untransferred character count, start address STADR and end address EDADR of an area which changes its state, and TCNT indicating transferred character counts are established in the hardware stack of the RAM 12. In step S2, CNT in the directory DIR(B) of FIG. 3 is copied to RMCNT and ADR is copied to STADR, and a sum of ADR and CNT of the directory DIR(D) is stored in EDADR. In step S3, it is checked if the status change has been completed or not. This is carried out immediately before the block transfer. If RMCNT=0, the completion is determined. If RMCNT≠0, the block transfer is initiated. In step S4, it is checked if RMCNT<512 or not. If RMCNT<512, RMCNT is set to TCNT, and if RMCNT≧512, 512 is set to TCNT. In step S5, RMCNT-TCNT is stored in RMCNT. In step S6, as many characters of the character sequence (B) as the number indicated by TCNT starting from the address indicated by STADR are transferred to the transfer buffer 14, and in step S7, as many characters in the character sequence memory 13 as the number indicated by EDADR starting from the address indicated by the sum of STADR and TCNT are shifted to the addresses following the address indicated by STADR. In step S8, as many characters of the content of TB as the number indicated by TCNT are transferred to the addresses following the address indicated by the difference of EDADR and TCNT.

On the other hand, if RMCNT=0 in step S3, an end processing is carried out. In Steps S9 and S10, the directories DIR(C), DIR(D) and DIR(B) are processed to obtain the state shown in FIG. 6. FL denotes the character sequence memory 13 and TB denotes the character transfer buffer 14.

As described hereinabove, when the character sequence correction apparatus of the present invention is applied to inexpensive electronic equipment such as the electronic typewriter, a great advantage is attained. In electronic equipment such as the electronic typewriter, it is difficult to add a large capacity memory. By applying the present invention, not only the hardware cost is saved but also an operator can use as many areas of the character sequence memory 13 as is permitted by the capacity of the character sequence memory 13, and the deletion of the invalid character sequence at the end of the correction operation is not needed. Thus, a simple and convenient control is attained.

A configuration of the character sequence memory 13 for achieving the second object described above is shown in FIG. 9. Like FIG. 2, it comprises a directory field DIR and a character sequence memory area, but unlike FIG. 2, it has an area DIRCNT for indicating the number of character sequences and the character sequences (A)–(D) are arranged immediately behind the directory DIR(D).

Figures 8, 9, 10:
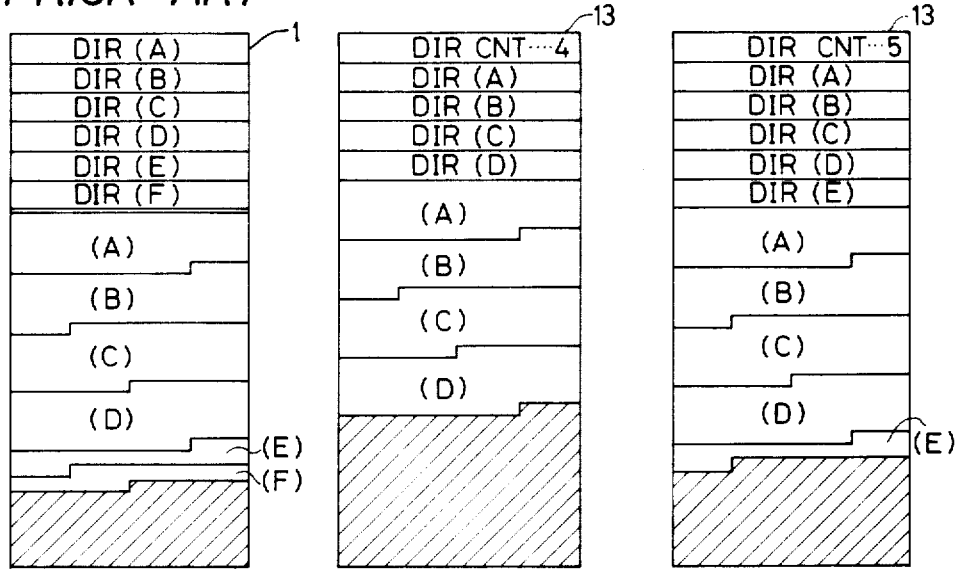
FIG. 8 shows a configuration of the prior art memory when a character sequence has been added.
FIG. 9 shows a configuration of the character sequence memory of the present invention.
FIG. 10 shows a configuration of the character sequence memory when a character sequence has been added to FIG. 9.
Figure 11:
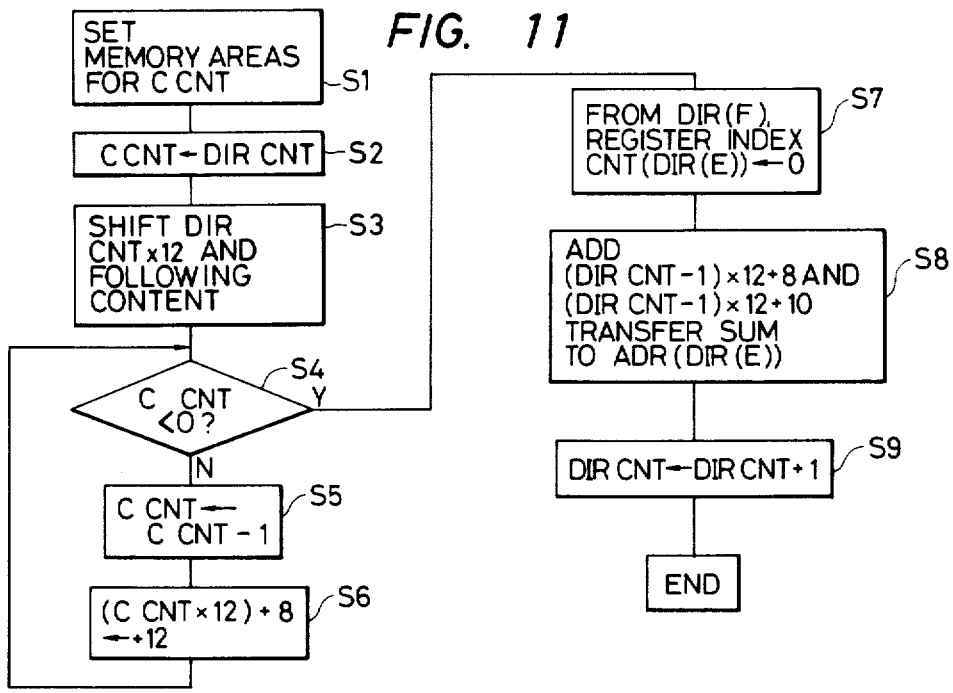
FIG. 11 is a flow chart of a control procedure of a character sequence control unit.

In such a configuration, when it is desired to add a character sequence (E), the control sequence shown in FIG. 11 is carried out. In step S1, a memory, area counter CCNT is set in the hardware stack. Counter CCNT is used to correct the address fields of the respective directories. In step S2, the content of the memory area DIRCNT of the character sequence memory 13 (which is "4" in the present embodiment because four character sequences are stored) is transferred to the memory area counter CCNT. In step S3, the field following the address specified by the product of the content of the memory area DIRCNT and the number of bytes in the directory field, i.e. 12, is shifted by 12 bytes. In step S4, counter CCNT is checked to determine if it is zero or not to determine if the correction of the address fields of the respective directories has been completed. If CCNT≧0, counter CCNT is decremented by one sequentially in steps S5 and S6 and the address field of the directory is incremented by 12. On the other hand, if CCNT<0 in step S4, the directory DIR(E) is formed for the newly added character sequence in step S7 so that it is allowed to add the character sequence (E) following to the character sequence (D). In step S8, (DIRCNT-1)×12+8 and (DIRCNT-1)×12+10 are added and the resulting sum is loaded to ADR-[DIR(E)]. In step S9, the content of the memory area DIRCNT is incremented by one and the character sequence (E) is added so that five character sequences are now stored. The number of characters of the character sequence (E) is set to CNT (character count field) of the directory DIR(E). As a result, a memory configuration shown in FIG. 10 is provided. By repeating similar sequences, character sequences (F) and (G) can be added into the character sequence memory 13.

As described hereinabove, since the memory 13 for the character sequence control is of variable length in the present character sequence control unit, when it is applied to electronic equipment such as the electronic typewriter, the memory 13 which is usually not frequently used is not necessary and the character sequence memory 13 can be used in an efficient manner.

Figure 12:
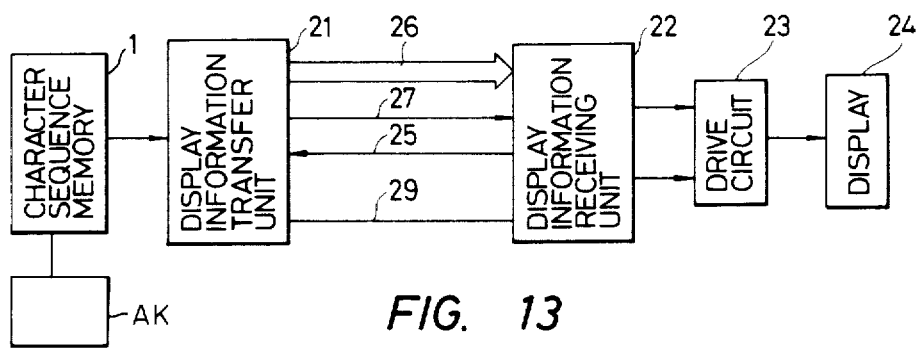
FIG. 12 shows a schematic configuration of another embodiment of the present invention.

FIG. 12 shows a schematic configuration for achieving the third and fourth objects of the present invention described above. Numeral 21 denotes a display information transfer unit which transfers information from the character sequence memory 1 to a display information receiving unit 22 through lines to be described later. The display information receiving unit 22 drives a display 24 through a drive circuit 23.

When a transfer request signal on a line 25 is active, the display information transfer unit 21 activates a set data signal on a line 27 and transfers the display information (for example, in the ASCII code) from the character sequence memory 1 to the display information receiving unit 22 through a data line 26. The display information receiving unit 22 deactivates the transfer request signal on the line 25 while it processes the received display information to inhibit the transferout of the display information by the display information transfer unit 21, and activates the transfer request signal on the line 25 after it has completed the proccessing. Thus, the display information transfer unit 21 and the display information receiving unit 22 are operated in a so-called hand shake manner.

When the display information receiving unit 22 receives display information, it stores the display information in a display register 28 (see FIG. 13) having positions corresponding to the number of characters of the display 24, for example, 20 characters.

Information for each character of the display 24 of the display information in the display register 28 and display information for each character are kept in synchronism, and the display information is displayed on the display 24 through the drive circuit 23. A primary control to the transfer of the display information is on the display information transfer unit 21 and the display information receiving unit 22 merely transfers the received information. As a result, if the display information receiving unit 22 is merely connected to the unit which sequentially sends out the character information in the character sequence memory 1 as is done in the prior art display information transfer unit, blank characters are transferred for each depression of the access key AK (FIG. 1) and no character is displayed on the display 24 during a period from the first depression of the access key AK to the second depression as described above.

In the present invention, in order to avoid the above situation, when the contents of the display information transfer unit 21 and the display register 28 in the receiving unit 22 are all blank codes (for example, $(20)_{HEX}$), a transfer request interrupt signal on a line 29 is activated and the display information transfer unit 21 transfers 20 characters of the character information immediately following to the transferred character information in the character sequence memory 1 to the display information receiving unit 22 without waiting for the next depression of an access key AK (FIG. 12). Immediately thereafter, the transfer request interrupt signal of the line 29 is deactivated. The control by the transfer request interrupt signal continues until a non-blank code is received by the display register 28 of the display information receiving unit 22 so that 20-character sequences are sequentially transferred until the non-blank code appears.

Figure 13:
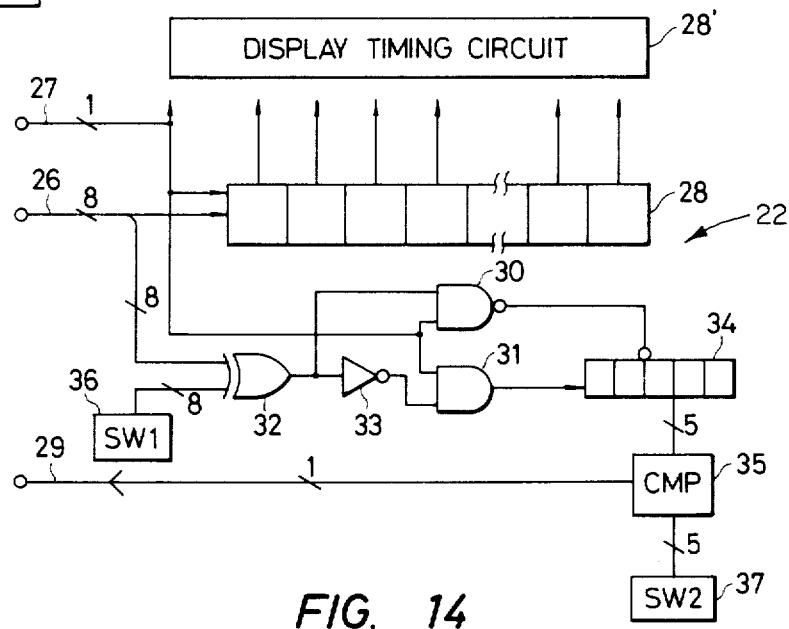
FIGS. 13 and 15 are block diagrams of control circuits therefor.

FIG. 13 shows a control circuit for the transfer request interrupt signal. The like elements to those shown in FIG. 12 are designated by the like numerals.

Numeral 28 denotes the display register which may be a first-in first-out type 8-bit × 20-digit shift register. Numeral 30 denotes a NAND gate, numeral 31 denotes an AND gate, numeral 32 denotes an exclusive OR gate, numeral 33 denotes an inverter, numeral 34 denotes a 5-bit counter, numeral 35 denotes a digital comparator and numerals 36 and 37 denote read-only memories which may comprise switches (for example, DIP switches).

The display register 28 sends out the display information for the respective digits of the 20-digit display 24 to a display timing circuit 28'.

Figure 14:
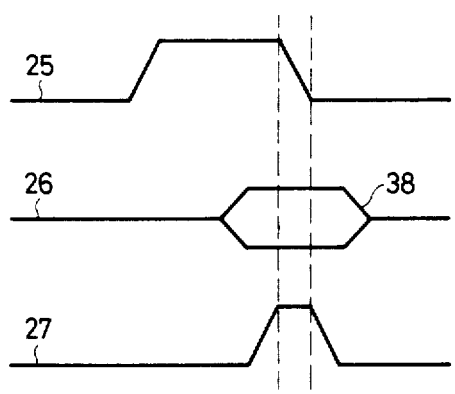
FIGS. 14 and 16 are diagrams of waveforms.

In the above configuration, when the transfer request signal on the line 25 is active, the display information transfer unit 21 transfers out a display information signal 38 as shown in FIG. 14 and the set data signal on the line 27 is activated. The display information on the data line 26 is loaded to the display register 28 and the display information in the display register 28 is shifted right and the display information stored at the right most position is shifted out.

An equality between the information from the switch 36, that is, the blank character code and the display information is checked by the exclusive OR gate 32, and if the output thereof is "0", that is, if the blank character code and the display information are equal, the AND gate 31 produces a signal having the same pulse width as the set data signal on the line 27. As a result, the counter 34 is incremented.

On the other hand, the output of the counter 34 is supplied to the digital comparator 35 and it is compared with the information from the switch 37, that is, the number of digits of the display 24. If the content of the counter 34 is larger than the number of digits, for example 20, of the display 24, the transfer request interrupt signal on the line 29 is activated to access the next 20 digits without waiting for the next depression of the access key AK, and the above operation is repeated.

On the other hand, if the output of the exclusive OR gate 32 is "1", that is, if the blank character code and the display ihformation are not equal, the NAND gate 30 produces a negative logic pulse to reset the counter 34. As a result, the transfer request interrupt signal on the line 29 is deactivated.

While the read-only memory shown by the switch 36 stores the code corresponding to the blank character in the present embodiment, other specific character codes may be stored therein so that the display of the specific characters in all of the digit positions can be prevented.

As described hereinabove, according to the present invention, when the character sequence is referred to, the wasteful keying operation is eliminated and the display of the blank characters in all of the display digit positions until the next depression of the access key AK is inhibited. Thus, a feeling of unrest to the operator is prevented.

Figure 15:
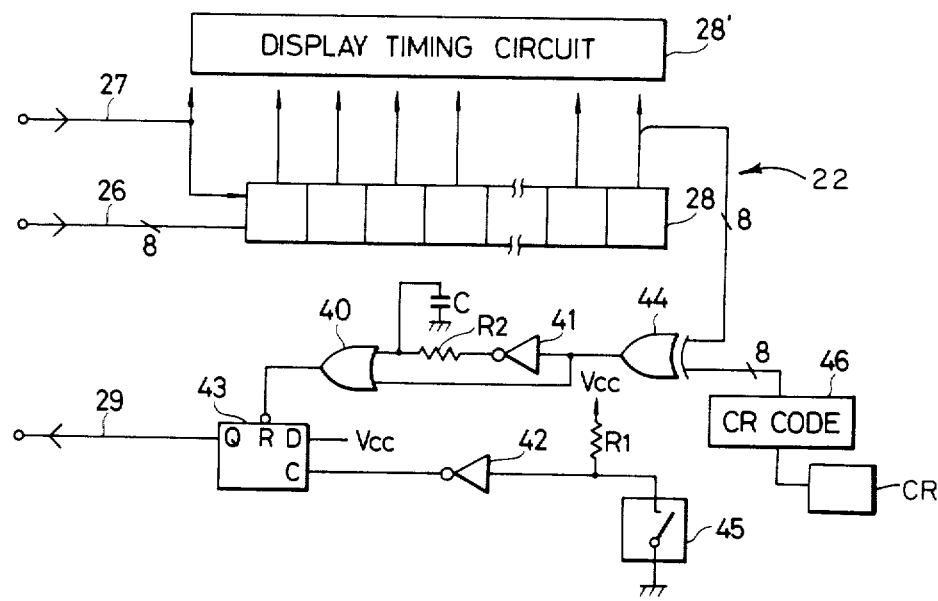

FIG. 15 shows a circuit diagram for achieving the fourth object of the present invention. As described above, the primary control to the transfer of the display information is on the display information transfer unit 21 in FIG. 12, and the display information receiving unit 22 merely receives the information. Accordingly, if the display information receiving unit 22 is connected to the unit which sequentially sends out the character information in the character sequence memory 1 as is done in the prior art display information transfer unit, it is not possible to rapidly refer to the head of the paragraph as described above.

In the present invention, the transfer request interrupt signal line 29 is provided, and when the display information is held in the display information transfer unit 21, a special key 45 (FIG. 15) for permitting reference to the head of the paragraph in the character sequence is depressed so that the transfer request interrupt signal is activated and the display information transfer unit 21 transfers the character information immediately following the transferred character information in the character sequence memory 1 to the display information receiving unit 22 as one display information. Immediately thereafter, the transfer request interrupt signal on the line 29 is deactivated. The control by the transfer request interrupt signal continues until a specific code is received at the rightmost digit position of the display register 28 of the display information receiving unit 22.

The specific code is used to discriminate the paragraph. In the present embodiment, $CR(OD)_{HEX}$ of the ASCII code is used. Unless a carriage return (CR) key CR is depressed, the CR code is not stored in the character sequence in the memory 46. Thus, in order to search the head of the paragraph, the CR code may be searched.

In FIG. 15, numeral 40 denotes an OR gate, numerals 41 and 42 denote inverters, numeral 43 denotes a flip-flop, numeral 44 denotes an exclusive OR gate, numeral 45 denotes a special key, numeral 46 denotes a switch comprising a read-only memory constructed by a DIP switch, for example, C denotes a capacitor, and R1 and R2 denote resistors. The display register 28 sends out the display information for the respective digits of the display 24 to the display timing circuit 28'.

Figure 16:
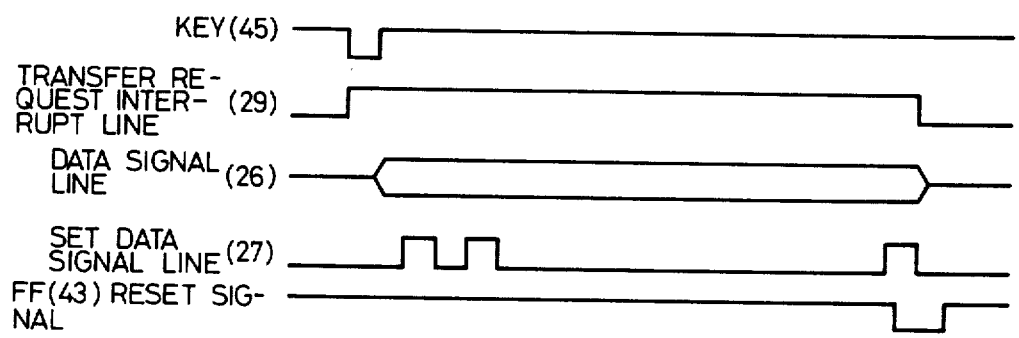

The operation of the present embodiment thus constructed is explained with reference to FIG. 16.

When an operator depresses the special key 45 to refer to the head of the paragraph in the character sequence, the flip-flop 43 is triggered to produce a logical "1" output, which is supplied to the transfer request interrupt signal line 29. Thus, the transfer request interrupt signal is activated.

As a result, when the character information is transferred from the display information transfer unit 21, the content of the display register 28 is shifted toward the rightmost digit position. If the right most digit of the display register 28 is not the CR code, the transfer request interrupt signal on the line 29 remains activated so that new display information is sent out from the display information transfer unit 21. The above operation is repeated until the CR code reaches the rightmost digit position of the display register 28.

When the rightmost digit is the CR code, the circuit comprising the OR circuit 40, the inverter 41, the capacitor C and the resistor R2 operates to produce a logical "0" pulse, which resets the flip-flop 43 to deactivate the transfer request interrupt signal on the line 29. The digits of the display register 28 now retain the display information of the head of the new paragraph. As a result, the CR code and the paragraph of the character sequence are displayed on the display 24.

While the CR code is set in the read-only memory 46 constructed by the DIP switch to allow quick reference to the CR code and the following character sequence in the above embodiment, other print control codes such as tabulation, vertical tabulation or form feed may be set in the read-only memory 46 to allow quick reference. The present invention may be applied to refer to character sequences starting from control codes other than character codes (for example, ASCII code $(00)_{HEX}$-$(1F)_{HEX}$).

As described hereinabove, according to the present invention, when the operator depresses the special key 45, a desired paragraph can be referenced. Thus, the reference of the registered character sequence can be readily attained.

What I claim is:

1. An electronic typewriter comprising:
   memory means for storing a formated document as an electrical code;
   register means for registering a predetermined length of the formated document;
   transfer means for transferring the predetermined length of the formated document from said memory means to said register means;
   a display instruction key for generating a display instruction;
   display means having a display area for simultaneously displaying the predetermined length of the formated document registered in said register means; and
   detection means for generating a detection signal when all the predetermined length of the formated document registered in said register means are a blank electrical code, wherein
   said transfer means is responsive to either of said detection signal and said display instruction generated by said key to execute said transfer.

2. An electronic typewriter according to claim 1 wherein said detection means detects when all of the electrical codes registered in said register means represent blank information, the display of which is not necessary.

3. Electronic equipment comprising:
   memory means for storing a plurality of character sequences; directory information including an index; the addresses of said character sequences and the number of characters in each of said sequences; and the number of said character sequences; and
   control means for adding new character sequences and directory information for storage in said memory means; said control means being operable to modify the position of existing character sequences in said memory means to make space for the new directory information, to modify correspondingly the addresses in the directory information of the existing character sequences, to add the new directory information in the space provided by said movement of the existing character sequences, to add the new character sequence, and to modify correspondingly the number indicating the number of character sequences stored.

4. Electronic equipment according to claim 3 wherein said control means controls storage of new character sequences in said memory means to increase the number of character sequences stored therein.

5. Electronic equipment according to claim 3 wherein said address information includes information relating to head addresses of said character sequences.

6. Electronic equipment comprising:
   memory means for storing a plurality of character sequences and directory information to make discriminations among said character sequences, the directory information including indexes and addresses; and
   control means for adding new character sequences and new directory information for storage in said memory means; said memory means being operable to modify the addresses in said existing directory information in association with the addition of said new character sequences and new directory information, and to store said new directory information into the positions where said existing character sequences have been formerly stored.

7. Electronic equipment according to claim 6, wherein said control means comprises relocation means for relocating the character sequences stored in said memory means.

8. Electronic equipment according to claim 6, wherein said memory means comprises a first location part for storing the character sequences and a second location part for storing the directory information.

9. Electronic equipment according to claim 6, wherein said memory means further stores the number of said character sequences.

10. Electronic equipment according to claim 8, wherein said control means comprises increment means for incrementing the number of said location parts every time an additional character sequence is stored.

11. Electronic equipment according to claim 7, wherein said memory means comprises a first location part for storing the character sequences and a second location part for storing the directory information.

12. Electronic equipment according to claim 7, wherein said memory means further stores the number of said character sequences.

13. Electronic equipment according to claim 11, wherein said control means comprises increment means for incrementing the number of said location parts every time an additional character sequence is stored.

14. Electronic equipment according to claim 8, wherein said memory means further comprises a third location part so as to store the number of said character sequences.

15. Electronic equipment according to claim 14, wherein said control means comprises increment means for incrementing the number of said location parts every time an additional character sequence is stored.

16. Electronic equipment according to claim 11, wherein said memory means further stores the number of said character sequences.

17. Electronic equipment according to claim 16, wherein said control means further comprises increment means for incrementing the number of said location parts every time an additional character sequence is stored.

18. Electronic equipment according to claim 8, wherein respective areas of said first location part and said second location part are located in parallel, and further comprising means for varying a boundary between the areas of said first and second location parts in response to the operation of said control means.

* * * * *

UNITED STATES PATENT AND TRADEMARK OFFICE
CERTIFICATE OF CORRECTION

PATENT NO. : 4,585,360
DATED : April 29, 1986
INVENTOR(S) : HIROYUKI UEDA

It is certified that error appears in the above-identified patent and that said Letters Patent is hereby corrected as shown below:

On the Title Page, under "[56]"

change "3,260340" to --3,260,340--; and change "Goldberry et al." to --Goldsberry et al.--.

IN THE ABSTRACT:

Line 11, change "tranferred" to --transferred--.

Column 4, line 37, change "SCB," to --SCB.--.

line 66, change "referring the" to --referring to the--.

Column 6, line 49, change "transferout" to --transfer-out--.

Column 7, lines 52-53, change "right most" to --rightmost--.

Column 8, line 5, change "ihformation" to --information--.

Column 9, line 8, change "right most" to --rightmost--.

Column 9, lines 61-62, change "claim 1 wherein" to --claim 1, wherein--.

Column 10, lines 17-18, change "claim 3 wherein" to --claim 3, wherein--.

UNITED STATES PATENT AND TRADEMARK OFFICE
CERTIFICATE OF CORRECTION

PATENT NO. : 4,585,360
DATED : April 29, 1986
INVENTOR(S) : HIROYUKI UEDA

It is certified that error appears in the above-identified patent and that said Letters Patent is hereby corrected as shown below:

Column 10, lines 21-22, change "claim 3 wherein" to --claim 3, wherein--.

Signed and Sealed this

Third Day of February, 1987

Attest:

DONALD J. QUIGG

Attesting Officer

Commissioner of Patents and Trademarks